(12) United States Patent  
Sularea (10) Patent No.: US 12,237,717 B2  
(45) Date of Patent: Feb. 25, 2025

(54) SYSTEMS AND METHODS FOR OPERATING WITH SECONDARY POWER SOURCES

(71) Applicant: SCHNEIDER ELECTRIC IT CORPORATION, Foxboro, MA (US)

(72) Inventor: Vasile Simion Sularea, Kolding (DK)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 268 days.

(21) Appl. No.: 17/949,630

(22) Filed: Sep. 21, 2022

(65) Prior Publication Data

US 2024/0097484 A1   Mar. 21, 2024

(51) Int. Cl.  
*H02J 9/06* (2006.01)  
*H02J 3/32* (2006.01)  
*H02J 3/38* (2006.01)

(52) U.S. Cl.  
CPC ............... *H02J 9/062* (2013.01); *H02J 3/32* (2013.01); *H02J 3/381* (2013.01); *H02J 2300/22* (2020.01)

(58) Field of Classification Search  
CPC .... H02J 9/062; H02J 3/32; H02J 3/381; H02J 2300/22; H02J 3/007; H02J 2310/16; G06F 1/30  
USPC ........................................................ 307/142  
See application file for complete search history.

(56) References Cited

U.S. PATENT DOCUMENTS

| | | | |
|---|---|---|---|
| 9,910,472 B1 | 3/2018 | Wishman et al. | |
| 10,135,251 B2 | 11/2018 | Berard | |
| 10,505,367 B2 | 12/2019 | Chambon | |
| 2012/0326668 A1* | 12/2012 | Ballatine | B60L 53/20 320/109 |
| 2014/0054967 A1* | 2/2014 | Toyoda | H02J 3/466 307/65 |
| 2014/0210271 A1* | 7/2014 | Toyoda | H02J 9/061 307/66 |
| 2016/0099607 A1 | 4/2016 | Landis | |

FOREIGN PATENT DOCUMENTS

| | | |
|---|---|---|
| CN | 201562980 U | 8/2010 |
| CN | 112803573 A | 5/2021 |

OTHER PUBLICATIONS

Extended European Search Report from corresponding European Application No. 23198115.0 dated Mar. 13, 2024.

* cited by examiner

*Primary Examiner* — Richard Tan  
(74) *Attorney, Agent, or Firm* — Lando & Anastasi, LLP (57) ABSTRACT

Aspects of the disclosure include a power supply system comprising at least one first input configured to be coupled to a primary power source, at least one second input configured to be coupled to a first and second secondary power source, an output, a first and second power supply coupled to the first and second inputs, and at least one controller configured to receive a load-power measurement associated with a required load power, determine whether the required load power is greater than secondary power available from the first secondary power source, and control, responsive to determining that the required load power is greater than the available secondary power, the first power supply to provide power derived from the primary and secondary power sources to the output, and the second power supply and second secondary power source to operate in a standby mode to prepare to provide power to the output.

31 Claims, 7 Drawing Sheets

SYSTEMS AND METHODS FOR OPERATING WITH SECONDARY POWER SOURCES

BACKGROUND

1. Field of the Disclosure

At least one example in accordance with the present disclosure relates generally to power supplies.

2. Discussion of Related Art

Power devices, such as uninterruptible power supplies (UPSs), may be used to provide regulated, uninterrupted power for sensitive and/or critical loads, such as computer systems and other data-processing systems. Existing UPSs include online UPSs, offline UPSs, line-interactive UPSs, as well as others. UPSs may provide output power to a load. The output power may be derived from a primary source of power, such as a utility-mains source, and/or derived from a back-up source of power, such as an energy-storage device.

SUMMARY

According to at least one aspect of the present disclosure, a power supply system is provided comprising at least one first input configured to be coupled to a primary power source, at least one second input configured to be coupled to a first secondary power source and configured to be coupled to a second secondary power source, an output configured to be coupled to a load, a first power supply coupled to the at least one first input and to the at least one second input, a second power supply coupled to the at least one first input and to the at least one second input, and at least one controller coupled to the first power supply and the second power supply, the at least one controller being configured to receive a load-power measurement associated with a required load power, determine whether the required load power is greater than an available secondary power, the available secondary power being available from the first secondary power source, and control, responsive to determining that the required load power is greater than the available secondary power, the first power supply to provide output power to the output, the output power being derived from the primary power source and the first secondary power source, and the second power supply and the second secondary power source to operate in a standby mode to prepare to provide power to the output.

In some examples, the at least one second input includes a first connection and a second connection. In various examples, the first connection and the second connection are each switchably couplable to the first secondary power source or the second secondary power source. In at least one example, the first power supply is switchably couplable to the first secondary power source or the second secondary power source via the first connection, and the second power supply is switchably couplable to the first secondary power source or the second secondary power source via the second connection.

In some examples, controlling the first power supply to provide the output power to the output includes switchably coupling the first power supply to the first secondary power source via the first connection, and controlling the second power supply and the second secondary power source in the standby mode includes switchably coupling the second power supply to the second secondary power source via the second connection. In various examples, the first secondary power source is a renewable power source and the secondary power is renewable power, and controlling the first power supply to provide the output power to the output includes controlling the first power supply to draw the available renewable power from the renewable power source and controlling the first power supply to draw a remaining required power from the primary power source, the remaining required power being determined based on a difference between the required load power and the available renewable power.

In at least one example, the first power supply includes a first AC/DC converter, a first DC/DC converter, and a first DC/AC converter, and the second power supply includes a second AC/DC converter, a second DC/DC converter, and a second DC/AC converter. In some examples, the first AC/DC converter and the second AC/DC converter are coupled to the at least one first input. In various examples, the first DC/DC converter and the second DC/DC converter are coupled to the at least one second input. In at least one example, the at least one second input includes a first connection coupled to the first DC/DC converter and a second connection coupled to the second DC/DC converter.

In some examples, the first DC/AC converter and the second DC/AC converter are coupled to the output. In various examples, the first power supply is a first uninterruptible power supply and the second power supply is a second uninterruptible power supply. In at least one example, the power supply system includes an uninterruptible power supply including the first power supply and the second power supply. In some examples, the at least one controller is configured to control the first power supply to provide the output power to the output and control the second power supply and the second secondary power source to operate in the standby mode responsive to determining that the required load power is greater than the available secondary power, and the required load power is not greater than a power rating of the first power supply.

In various examples, the at least one controller is further configured to control, responsive to determining that the required load power is not greater than the available secondary power, the first power supply to provide second output power to the output, the second output power being derived from the first secondary power source, and the second power supply and the second secondary power source to operate in the standby mode. In at least one example, the at least one controller is further configured to control the second power supply to provide recharging power derived from the available secondary power to the second secondary power source responsive to determining that the required load power is not greater than the available secondary power.

In some examples, the at least one controller is configured to control, responsive to determining that the required load power is greater than the available secondary power and that the required load power is greater than a power rating of the first power supply, the first power supply and the second power supply to provide second output power to the output, the second output power being derived from the primary power source, and maintain at least one connection between the output and the second secondary power source. In various examples, the first secondary power source is a renewable power source. In at least one example, the second secondary power source is an energy-storage device.

According to at least one aspect of the disclosure, a non-transitory computer-readable medium storing thereon sequences of computer-executable instructions for controlling a power supply system including a first power supply and a second power supply and being configured to be coupled to a primary power source, a first secondary power source, a second secondary power source, and a load is provided, the sequences of computer-executable instructions including instructions that instruct at least one processor to receive a load-power measurement associated with a required load power, determine whether the required load power is greater than an available secondary power, the available secondary power being available from the first secondary power source, and control, responsive to determining that the required load power is greater than the available secondary power the first power supply to provide output power to the load, the output power being derived from the primary power source and the first secondary power source, and the second power supply and the second secondary power source to operate in a standby mode to prepare to provide power to the output.

In some examples, the first secondary power source is a renewable power source and the secondary power is renewable power, and controlling the first power supply to provide the output power to the load includes controlling the first power supply to draw the available renewable power from the renewable power source and controlling the first power supply to draw a remaining required power from the primary power source, the remaining required power being determined based on a difference between the required load power and the available renewable power. In various examples, the instructions instruct the at least one processor to control the first power supply to provide the output power to the load and operate the second power supply and the second secondary power source responsive to the required load power being greater than the available secondary power, and the required load power being less than or equal to a power rating of the first power supply.

In at least one example, the instructions instruct the at least one processor to control, responsive to determining that the required load power is not greater than the available secondary power the first power supply to provide second output power to the load, the second output power being derived from the first secondary power source, and the second power supply to and the second secondary power source to operate in the standby mode. In some examples, the instructions instruct the at least one processor to control the second power supply to provide recharging power derived from the available secondary power responsive to determining that the required load power is not greater than the available secondary power. In various examples, the instructions instruct the at least one processor to control, responsive to determining that the required load power is greater than the available secondary power and that the required load power is greater than a power rating of the first power supply, the first power supply and the second power supply to provide second output power to the load, the second output power being derived from the primary power source, and maintain at least one connection between the power supply system and the second secondary power source.

According to at least one aspect of the disclosure, a method for controlling a power supply system including a first power supply and a second power supply and being configured to be coupled to a primary power source, a first secondary power source, a second secondary power source, and a load is provided, the method comprising receiving a load-power measurement associated with a required load power, determining whether the required load power is greater than an available secondary power, the available secondary power being available from the first secondary power source, and controlling, responsive to determining that the required load power is greater than the available secondary power, the first power supply to provide output power to the load, the output power being derived from the primary power source and the first secondary power source, and the second power supply to maintain a connection between the power supply system and the first secondary power source.

In some examples, controlling the first power supply to provide the output power to the load includes controlling the first power supply to draw the available secondary power from the secondary power source and controlling the first power supply to draw a remaining required power from the primary power source, the remaining required power being determined based on a difference between the required load power and the available secondary power. In various examples, the method includes controlling the first power supply to provide the output power to the load and operate the second power supply and the second secondary power source in the standby mode responsive to the required load power being greater than the available secondary power, and the required load power being less than or equal to a power rating of the first power supply.

In at least one example, the method includes controlling, responsive to determining that the required load power is not greater than the available secondary power, the first power supply to provide second output power to the load, the second output power being derived from the first secondary power source, and the second power supply and the second secondary power source to operate in the standby mode. In some examples, the method includes controlling the second power supply to provide recharging power derived from the available secondary power responsive to determining that the required load power is not greater than the available secondary power. In various examples, the method includes controlling, responsive to determining that the required load power is greater than the available secondary power and that the required load power is greater than a power rating of the first power supply, the first power supply and the second power supply to provide second output power to the load, the second output power being derived from the primary power source, and maintain at least one connection between the power supply system and the second secondary power source.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Many uninterruptible power supplies (UPS s) are configured to provide uninterrupted power to one or more loads. A UPS may include a first connection coupled to a primary power supply, such as a utility mains, a second connection coupled to an energy-storage device, such as a battery, and a third connection coupled to one or more loads. If power is available from the primary power supply, the UPS may draw primary power from the primary power supply to produce output power provided to the one or more loads. If power is not available from the primary power supply, the UPS may instead draw backup power from the energy-storage device to produce output power provided to the one or more loads.

In some examples, a UPS may be connected to one or more power supplies in addition to, or alternative to, the primary power source and the energy-storage device. For example, the UPS may be connected to a renewable power source, such as a solar panel, a wind turbine, a hydroelectric-power source, and so forth. It may be advantageous to prioritize drawing renewable power from the renewable power source over drawing grid power from a primary source, for example, for cost efficiency and environmental concerns. Accordingly, a UPS may be designed to be able to draw power from a primary power source (for example, a grid), a renewable-power source (for example, a solar panel), and an energy-storage device (for example, a battery).

Some renewable power sources, such as solar panels, may provide DC power to the UPS. Accordingly, a UPS may receive AC primary power from a primary power supply, DC renewable power from a renewable power source, and DC back-up power from an energy-storage device, and may provide AC output power to one or more loads. The UPS may include one or more power modules to produce the output power from primary power, renewable power, and/or back-up power. Each power module may include an AC/DC converter, a DC/DC converter, and a DC/AC converter. The AC/DC converter may convert primary AC power to converted DC power. The DC/DC converter may convert renewable DC power and/or back-up DC power to converted DC power. The DC/AC converter may convert converted DC power from the AC/DC converter and/or DC/DC converter to output AC power.

In some examples, a power module may include a first DC/DC converter configured to be coupled to the renewable power source and a second DC/DC converter configured to be coupled to the backup-power source. Such a configuration enables the UPS to be simultaneously electrically connected to both the renewable power source and the energy-storage device because the renewable power source and the backup-power source are each coupled to a dedicated DC/DC converter. However, such a configuration also has an increased component count by implementing a second DC/DC converter, which may increase a cost, size, and/or power consumption of the UPS.

In various examples, a power module may include a DC/DC converter configured to be switchably coupled to either the renewable power source or the energy-storage device. Such a configuration may advantageously omit a second DC/DC converter while enabling the UPS to draw DC power from either the renewable power source or the back-up power source. However, if the DC/DC converter is connected to the renewable power source and power from the energy-storage device is then demanded (for example, because power from the primary power source and/or renewable power source is unavailable or insufficient to meet load requirements), the DC/DC converter may be switched from being connected to the renewable power source to being connected to the energy-storage device. The time consumed in performing this switching operation may introduce an undesirable drop in output power because backup power is not immediately available to the DC/DC converter.

In light of the foregoing, examples described herein provide a power supply system including a first power module, and a second power module coupled in parallel with the first power module. The power modules may be UPS s or components of UPS s having one or more power converters, for example. The first power module may remain in a standby mode of operation and maintain a connection to an energy-storage device while the second power module may be connected to either the energy-storage device or a renewable power source. Accordingly, the second power module may power one or more loads with output power derived from renewable power while the first power module remains prepared to provide output power derived from the energy-storage device. Example power supply systems therefore enable harnessing renewable power without substantially limiting the ability of the power supply system to respond to power outages.

Figure 1:
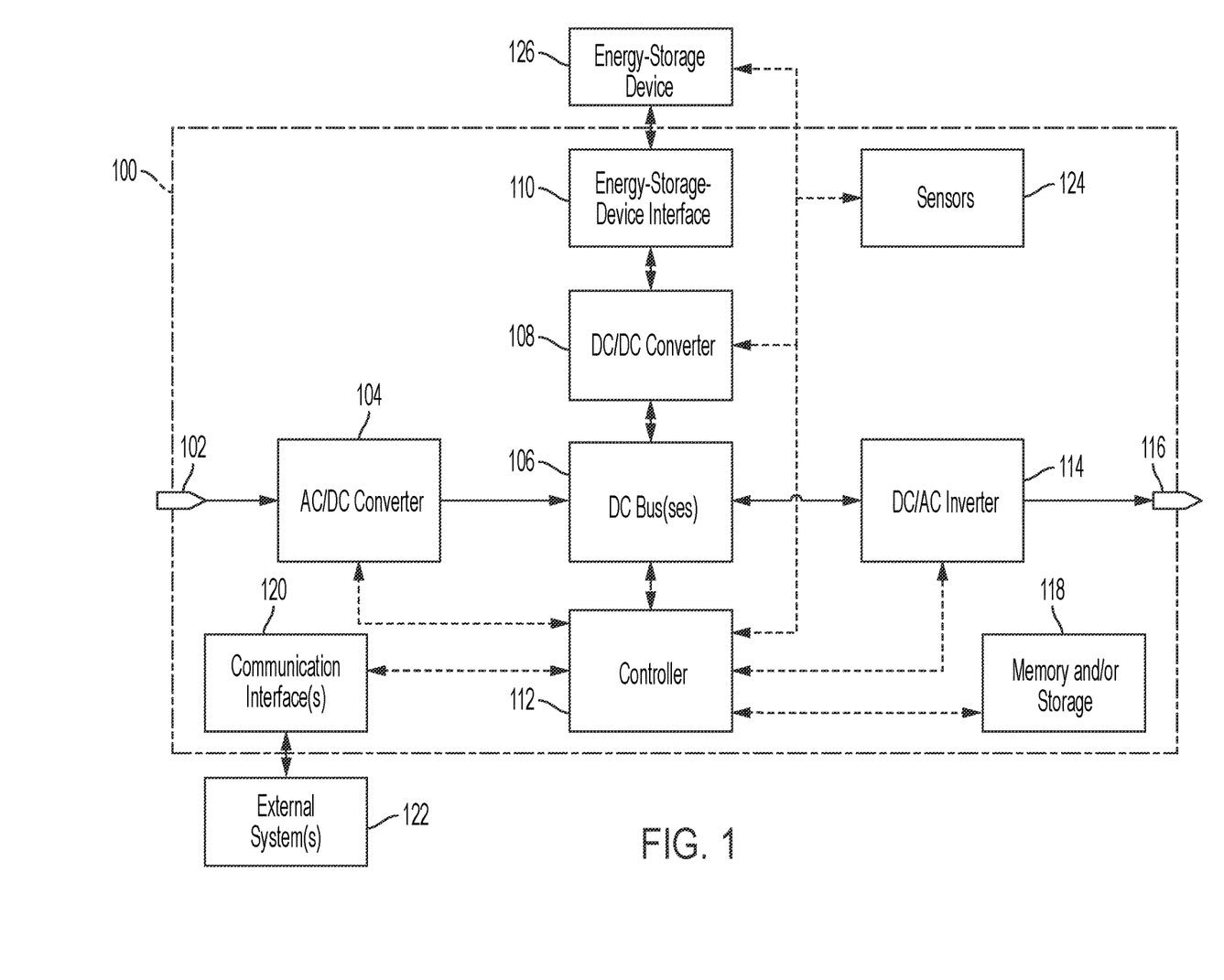
FIG. 1 illustrates a block diagram of an uninterruptible power supply (UPS) system according to an example.

FIG. 1 is a block diagram of a UPS 100 according to an example. The UPS 100 includes an input 102, an AC/DC converter 104, one or more DC busses 106, a DC/DC converter 108, an energy-storage-device interface 110, at least one controller 112 ("controller 112"), a DC/AC inverter 114, an output 116, a memory and/or storage 118, one or more communication interfaces 120 ("communication interfaces 120"), which may be communicatively coupled to one or more external systems 122 ("external systems 122"), and one or more voltage sensors and/or current sensors 124 ("sensors 124").

The input 102 is coupled to the AC/DC converter 104 and to an AC power source (not pictured), such as an AC mains power supply. The AC/DC converter 104 is coupled to the input 102 and to the one or more DC busses 106, and is communicatively coupled to the controller 112. The one or more DC busses 106 are coupled to the AC/DC converter 104, the DC/DC converter 108, and to the DC/AC inverter 114, and are communicatively coupled to the controller 112. The DC/DC converter 108 is coupled to the one or more DC busses 106 and to the energy-storage-device interface 110, and is communicatively coupled to the controller 112. The energy-storage-device interface 110 is coupled to the DC/DC converter 108, and is configured to be coupled to at least one energy-storage device 126 and/or another energy-storage device.

In some examples, the UPS 100 may be external to the at least one energy-storage device 126 and may be coupled to the at least one energy-storage device 126 via the energy-storage-device interface 110. In various examples, the UPS 100 may include one or more energy-storage devices, which may include the energy-storage device 126. The energy-storage device 126 may include one or more batteries, capacitors, flywheels, or other energy-storage devices in various examples.

The DC/AC inverter 114 is coupled to the one or more DC busses 106 and to the output 116, and is communicatively coupled to the controller 112. The output 116 is coupled to the DC/AC inverter 114, and to an external load (not pictured). The controller 112 is communicatively coupled to the AC/DC converter 104, the one or more DC busses 106, the DC/DC converter 108, the energy-storage-device interface 110, the DC/AC inverter 114, the memory and/or storage 118, and the communication interfaces 120. The sensors 124 are communicatively coupled to the controller 112 and may be coupled to one or more other components of the UPS 100, such as the input 102, the AC/DC converter 104, the one or more DC busses 106, the DC/DC converter 108, the energy-storage-device interface 110, the DC/AC inverter 114, and/or the output 116.

The input 102 is configured to be coupled to an AC mains power source and to receive input AC power having an input voltage level. The UPS 100 is configured to operate in different modes of operation based on the input voltage of the AC power provided to the input 102. The controller 112 may determine a mode of operation in which to operate the UPS 100 based on whether the input voltage of the AC power is acceptable. The controller 112 may include or be coupled to one or more sensors, such as the sensors 124, configured to sense parameters of the input voltage. For example, the sensors 124 may include one or more voltage and/or current sensors coupled to the input 102 and being configured to sense information indicative of a voltage at the input 102 and provide the sensed information to the controller 112.

When AC power provided to the input 102 is acceptable (for example, by having parameters, such as an input voltage value, that meet specified values, such as by falling within a range of acceptable input voltage values), the controller 112 controls components of the UPS 100 to operate in a normal mode of operation. In the normal mode of operation, AC power received at the input 102 is provided to the AC/DC converter 104. The AC/DC converter 104 converts the AC power into DC power and provides the DC power to the one or more DC busses 106. The one or more DC busses 106 distribute the DC power to the DC/DC converter 108 and to the DC/AC inverter 114. The DC/DC converter 108 converts the received DC power and provides the converted DC power to the energy-storage-device interface 110. The energy-storage-device interface 110 receives the converted DC power, and provides the converted DC power to the energy-storage device 126 to charge the energy-storage device 126. The DC/AC inverter 114 receives DC power from the one or more DC busses 106, converts the DC power into regulated AC power, and provides the regulated AC power to the output 116 to be delivered to a load.

When AC power provided to the input 102 from the AC mains power source is not acceptable (for example, by having parameters, such as an input voltage value, that do not meet specified values, such as by falling outside of a range of acceptable input voltage values), the controller 112 controls components of the UPS 100 to operate in a backup mode of operation. In the backup mode of operation, DC power is discharged from the energy-storage device 126 to the energy-storage-device interface 110, and the energy-storage-device interface 110 provides the discharged DC power to the DC/DC converter 108. The DC/DC converter 108 converts the received DC power and distributes the DC power amongst the one or more DC busses 106. For example, the DC/DC converter 108 may evenly distribute the power amongst the one or more DC busses 106. The one or more DC busses 106 provide the received power to the DC/AC inverter 114. The DC/AC inverter 114 receives the DC power from the one or more DC busses 106, converts the DC power into regulated AC power, and provides the regulated AC power to the output 116.

In some examples, the sensors 124 may include one or more sensors coupled to one or more of the foregoing components such that a voltage and/or current of one or more of the foregoing components may be determined by the controller 112. The controller 112 may store information in, and/or retrieve information from, the memory and/or storage 118. For example, the controller 112 may store information indicative of sensed parameters (for example, input-voltage values of the AC power received at the input 102) in the memory and/or storage 118. The controller 112 may further receive information from, or provide information to, the communication interfaces 120. The communication interfaces 120 may include one or more communication interfaces including, for example, user interfaces (such as display screens, touch-sensitive screens, keyboards, mice, track pads, dials, buttons, switches, sliders, light-emitting components such as light-emitting diodes, sound-emitting components such as speakers, buzzers, and so forth configured to output sound inside and/or outside of a frequency range audible to humans, and so forth), wired communication interfaces (such as wired ports), wireless communication interfaces (such as antennas), and so forth, configured to exchange information with one or more systems, such as the external systems 122, or other entities, such as human beings. The external systems 122 may include any device, component, module, and so forth, that is external to the UPS 100, such as a server, database, laptop computer, desktop computer, tablet computer, smartphone, central controller or data-aggregation system, other UPSs, and so forth.

Accordingly, the UPS 100 may provide output power at the output 116, the output power being derived from power received at the input 102 and/or the energy-storage-device interface 110. As discussed above, example power supply systems, which may include one or more UPSs, may derive output power from renewable power received from a renewable power source. For example, the UPS 100 may be coupled to a renewable power source via the DC/DC converter 108 and may draw power from either the renewable power source or the energy-storage device 126.

Figure 2:
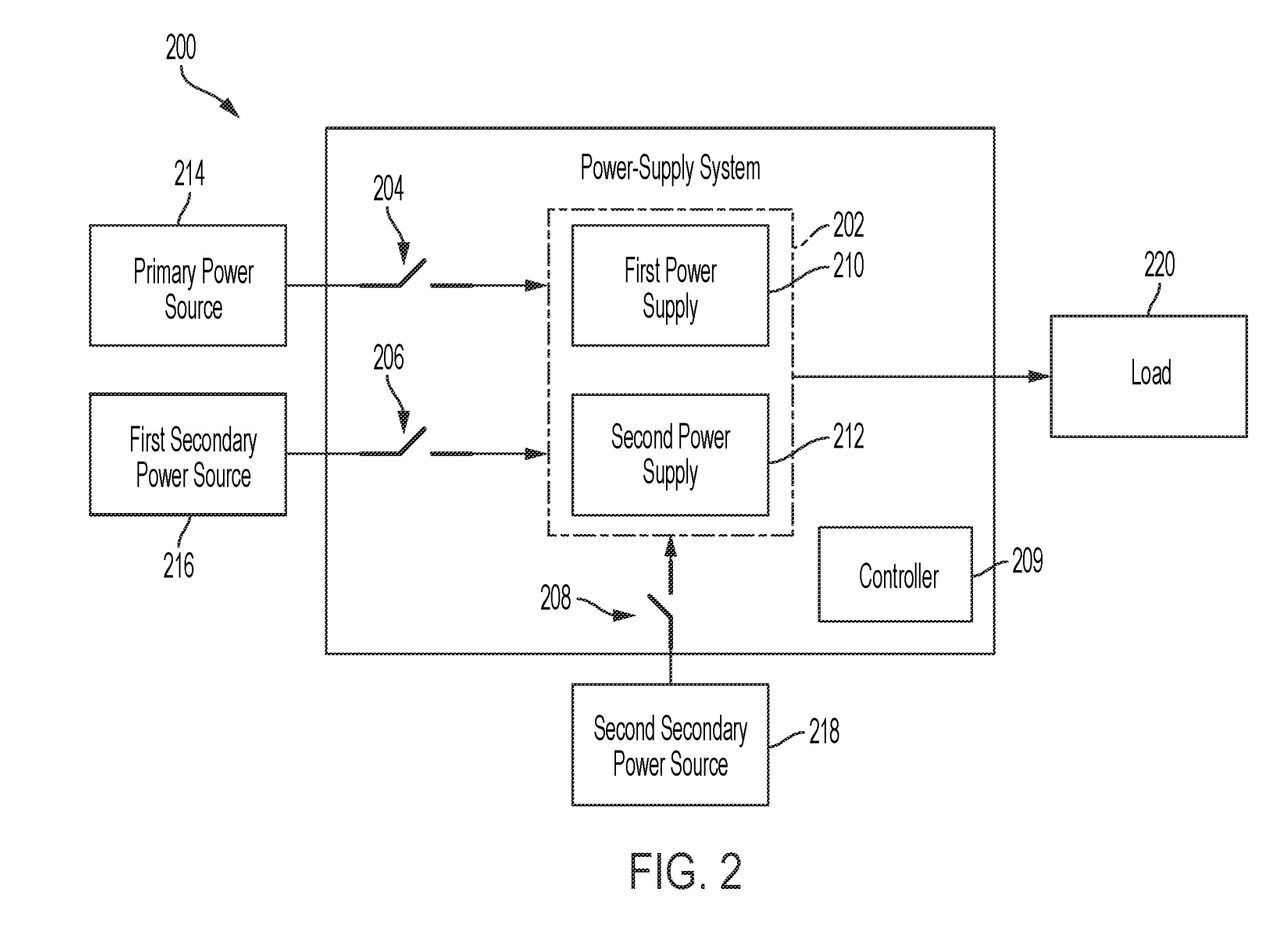
FIG. 2 illustrates a block diagram of a power supply system according to an example.

FIG. 2 illustrates a block diagram of a power supply system 200 according to an example. The power supply system 200 includes a plurality of power supplies 202, at least one primary-power switch 204, at least one renewable-power switch 206, at least one backup-power switch 208, and at least one controller 209 ("controller 209"). The plurality of power supplies 202 includes a first power supply 210 and a second power supply 212, which are coupled in parallel. In some examples, the first power supply 210 and the second power supply 212 may each be UPSs (for example, implemented as the UPS 100). In other examples, the power supply system 200 may be a UPS (for example, the UPS 100), and the power supplies 210, 212 may each be power modules.

The plurality of power supplies 202 is configured to be coupled to a primary power source 214 via the at least one primary-power switch 204. For example, where the power supplies 210, 212 are implemented as the UPS 100, each of the power supplies 210, 212 may be coupled to the at least one primary-power switch 204 via a respective implementation of the AC/DC converter 104. The plurality of power supplies 202 is further configured to be coupled to at least one first secondary power source 216 ("first secondary power source 216") via the at least one renewable-power switch 206. For example, where the power supplies 210, 212 are implemented as the UPS 100, each of the power supplies 210, 212 may be coupled to the at least one renewable-power switch 206 via a respective implementation of the DC/DC converter 108, either directly or via the energy-storage-device interface 110.

The plurality of power supplies 202 is further configured to be coupled to at least one second secondary power source 218 ("second secondary power source 218") via the at least one backup-power switch 208. For example, where the power supplies 210, 212 are implemented as the UPS 100, each of the power supplies 210, 212 may be coupled to the at least one backup-power switch 208 via a respective implementation of the DC/DC converter 108, either directly or via the energy-storage-device interface 110. The plurality of power supplies 202 is further configured to be coupled to one or more loads 220 ("load 220"). For example, where the power supplies 210, 212 are implemented as the UPS 100, each of the power supplies 210, 212 may be coupled to the load 220 via a respective implementation of the DC/AC inverter 114.

In various examples, the controller 209 may be communicatively coupled (for example, via a wired and/or wireless connection) to the at least one primary-power switch 204, the at least one renewable-power switch 206, the at least one backup-power switch 208, the first power supply 210, and the second power supply 212. In some examples, the controller 209 may be configured to be communicatively coupled to the primary power source 214, the first secondary power source 216, the second secondary power source 218, and/or the load 220. For purposes of illustrative clarity, connections between the controller 209 and other components of the power supply system 200 are omitted.

In various examples, the first secondary power source 216 may include one or more renewable power sources. For example, the first secondary power source 216 may include one or more solar panels. The second secondary power source 218 may include one or more energy-storage devices, such as one or more batteries. The load 220 may include one or more loads configured to draw a given amount of power in accordance with load requirements of the load 220.

It may be advantageous for the controller 209 to operate the power supply system 200 to maximize an amount of the renewable power drawn from the first secondary power source 216 that is used to satisfy the load requirements of the load 220. For example, if available renewable power that is available from the first secondary power source 216 meets or exceeds the load requirements of the load 220, it may be advantageous to satisfy the load requirements with the available renewable power. If the available renewable power does not meet the load requirements of the load 220, it may be advantageous to satisfy a portion of the load requirements with the available renewable power and a remaining portion of the load requirements with primary power from the primary power source 214. It may be advantageous for a first one of the power supplies 202 to satisfy the load requirements, provided that a power rating of the first one of the power supplies 202 meets or exceeds the load requirements, while a second one of the power supplies 202 stands by to provide uninterrupted backup power to the load 220 if needed, as discussed below.

In some examples, the power supplies 210, 212 may have the same power rating, and each may be capable of satisfying the expected load requirements. However, each of the power supplies 210, 212 may be configured to be coupled to only one of the first secondary power source 216 (which may include one or more renewable-power sources) or the second secondary power source 218 (which may include one or more backup-power devices) at any one time. Thus, if the first power supply 210 were to be connected to the first secondary power source 216 to draw renewable power from the first secondary power source 216, the first power supply 210 may not be able to maintain a connection with the second secondary power source 218 to be able to draw backup power from the second secondary power source 218. In various examples, therefore, the first power supply 210 (or second power supply 212) may operate to provide output power to the load 220

Figure 3:
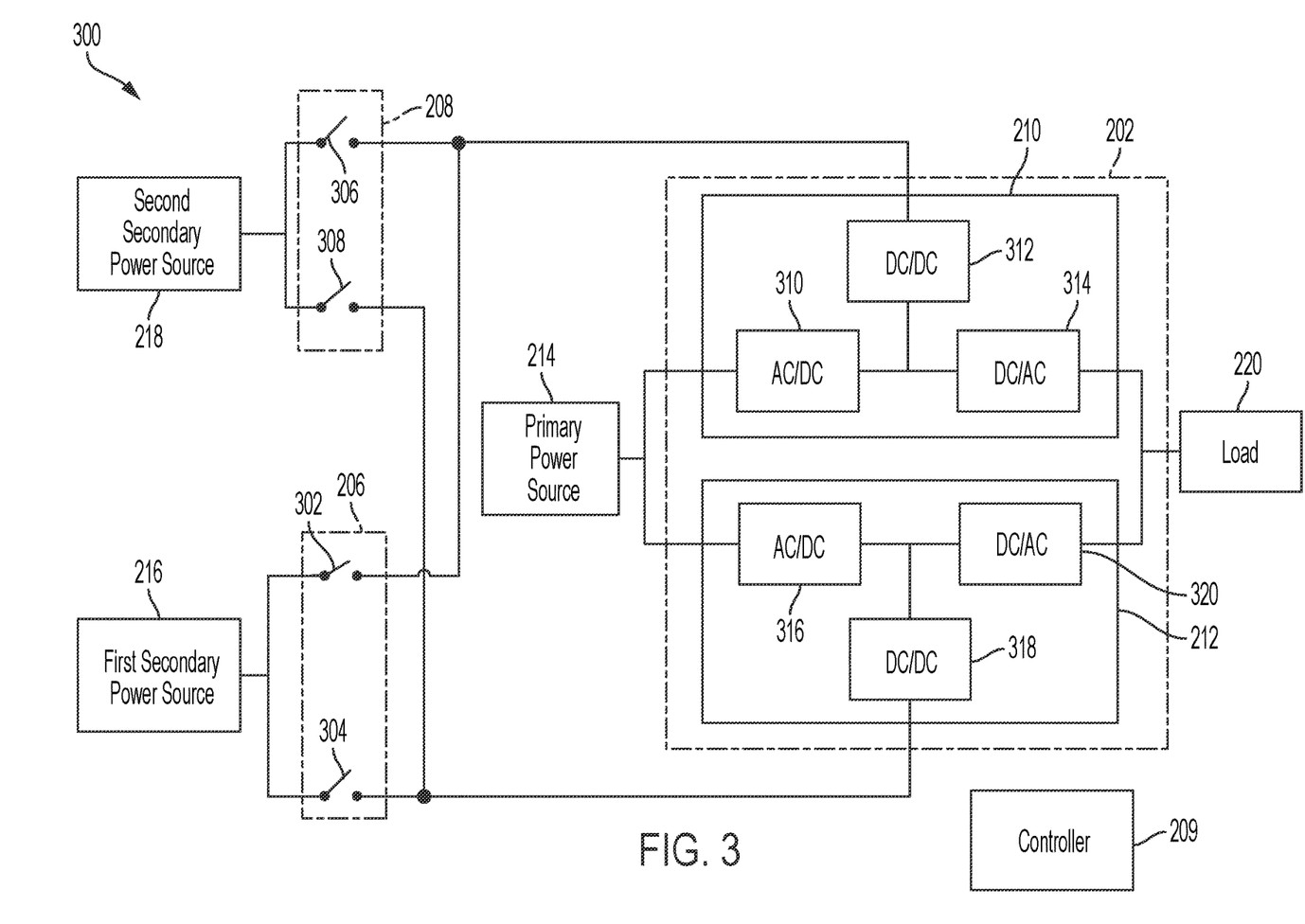
FIG. 3 illustrates a block diagram of a power supply system according to an example.

FIG. 3 illustrates a block diagram of a power supply system 300 in greater detail. The power supply system 300 may illustrate a more detailed version of the power supply system 200, and like components are labeled accordingly. The power supply system 300 includes the plurality of power supplies 202, the at least one renewable-power switch 206, the at least one backup-power switch 208, and the controller 209. The plurality of power supplies 202 includes the first power supply 210 and the second power supply 212.

The at least one renewable-power switch 206 includes a first renewable-power switch 302 and a second renewable-power switch 304. The at least one backup-power switch 208 includes a first backup-power switch 306 and a second backup-power switch 308. The first power supply 210 includes a first AC/DC converter 310, a first DC/DC converter 312, and a first DC/AC inverter 314. The second power supply 212 includes a second AC/DC converter 316, a second DC/DC converter 318, and a second DC/AC inverter 320.

The first renewable-power switch 302 is coupled to the first secondary power source 216 at a first connection, and is coupled to the first DC/DC converter 312 at a second connection. The first renewable-power switch 302 may be communicatively coupled to the controller 209. The second renewable-power switch 304 is coupled to the first secondary power source 216 at a first connection, and is coupled to the second DC/DC converter 318 at a second connection. The second renewable-power switch 304 may be communicatively coupled to the controller 209.

The first backup-power switch 306 is coupled to the second secondary power source 218 at a first connection, and is coupled to the first DC/DC converter 312 at a second connection. The first backup-power switch 306 may be communicatively coupled to the controller 209. The second backup-power switch 308 is coupled to the second secondary power source 218 at a first connection, and is coupled to the second DC/DC converter 318 at a second connection. The second backup-power switch 308 may be communicatively coupled to the controller 209.

The first AC/DC converter 310 is configured to be coupled to the primary power source 214 at a first connection, and is coupled to the first DC/DC converter 312 and the first DC/AC inverter 314 at a second connection. The first AC/DC converter 310 may be communicatively coupled to the controller 209. The first DC/DC converter 312 is coupled to the first renewable-power switch 302 and to the first backup-power switch 306 at a first connection, and is coupled to the first AC/DC converter 310 and the first DC/AC inverter 314 at a second connection. The first DC/DC converter 312 is switchably coupled to the first secondary power source 216 via the first renewable-power switch 302 and is switchably coupled to the second secondary power source 218 via the first backup-power switch 306 at the first connection. The first DC/DC converter 312 may be communicatively coupled to the controller 209. The first DC/AC inverter 314 is coupled to the first AC/DC converter 310 and the first DC/DC converter 312 at a first connection, and is configured to be coupled to the load 220 at a second connection. The first DC/AC inverter 314 may be communicatively coupled to the controller 209.

The second AC/DC converter 316 is coupled to the primary power source 214 at a first connection, and is coupled to the second DC/DC converter 318 and the second DC/AC inverter 320 at a second connection. The second AC/DC converter 316 may be communicatively coupled to the controller 209. The second DC/DC converter 318 is coupled to the second renewable-power switch 304 and to the second backup-power switch 308 at a first connection, and is coupled to the second AC/DC converter 316 and the second DC/AC inverter 320 at a second connection. The second DC/DC converter 318 is switchably coupled to the first secondary power source 216 via the second renewable-power switch 304 and is switchably coupled to the second secondary power source 218 via the second backup-power switch 308 at the first connection. The second DC/DC converter 318 may be communicatively coupled to the controller 209. The second DC/AC inverter 320 is coupled to the second AC/DC converter 316 and the second DC/DC converter 318 at a first connection, and is configured to be coupled to the load 220 at a second connection. The second DC/AC inverter 320 may be communicatively coupled to the controller 209.

The controller 209 is configured to be communicatively coupled to the primary power source 214, the first secondary power source 216, the second secondary power source 218, the load 220, the first renewable-power switch 302, the second renewable-power switch 304, the first backup-power switch 306, the second backup-power switch 308, the first AC/DC converter 310, the first DC/DC converter 312, the first DC/AC inverter 314, the second AC/DC converter 316, the second DC/DC converter 318, and the second DC/AC inverter 320.

As noted above, the power supplies 210, 212 may be implemented as the UPS 100. In various examples, the AC/DC converters 310, 316 may be examples of the AC/DC converter 104, the DC/DC converters 312, 318 may be examples of the DC/DC converter 108, and the DC/AC inverters 314, 320 may be examples of the DC/AC inverter 114.

Figure 4:
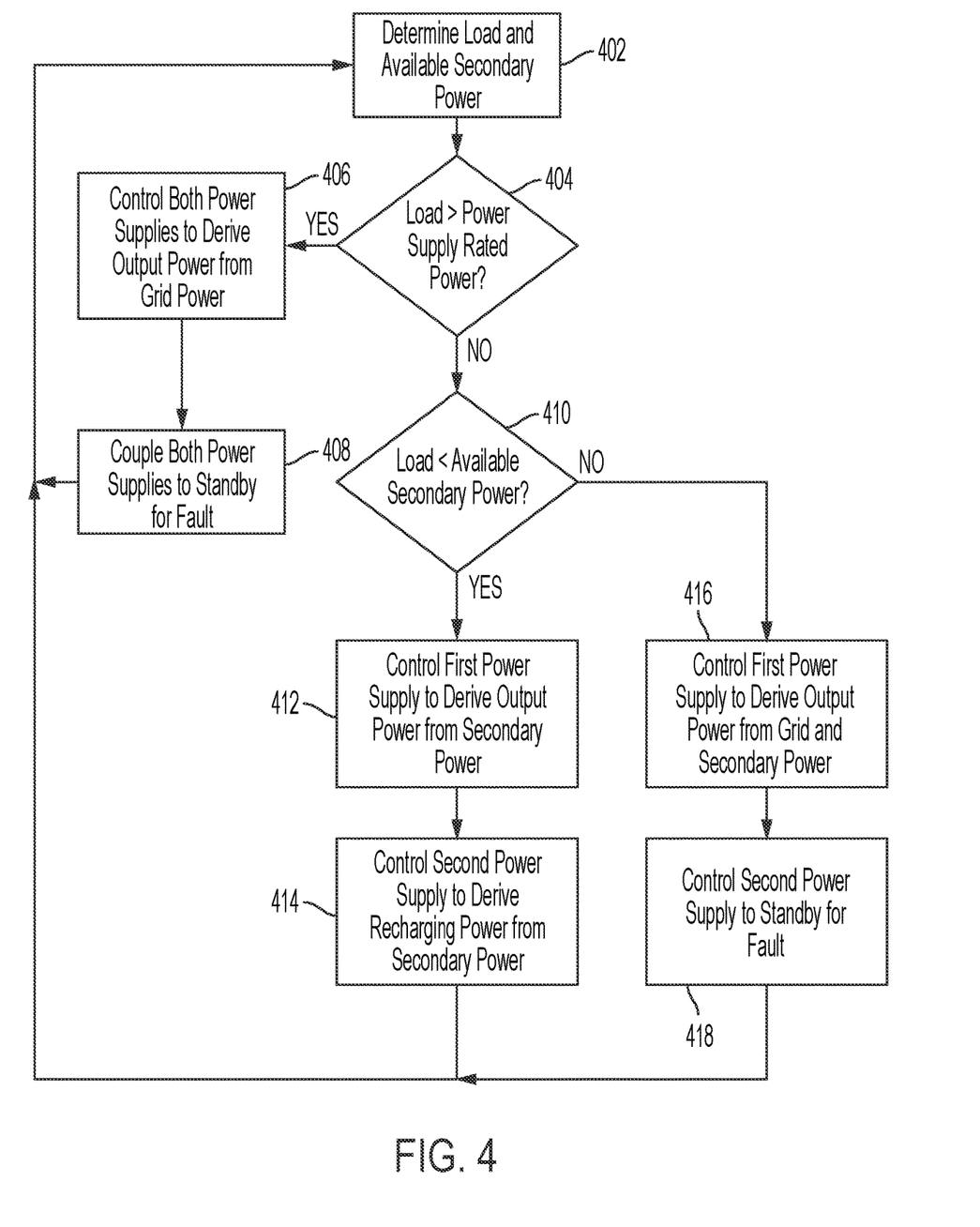
FIG. 4 illustrates a process of operating a power supply system according to an example.

FIG. 4 illustrates a process 400 of operating the power supply system 300 according to an example. The process 400 may be executed at least partially by the controller 209. For example, the controller 209 may include or be coupled to one or more computer-readable media storing instructions thereon that, when executed, cause the controller 209 to execute the process 400. In various examples, the controller 209 may include one or more processors such that the controller 209 executes the process 400.

At act 402, the controller 209 determines a load requirement of the load 220 and determines an available secondary power available from the first secondary power source 216. The load requirement of the load 220 may indicate an amount of required load power that the load 220 is currently drawing or is expected to draw in the future and which the plurality of power supplies 202 are to provide. The controller 209 may communicate with the load 220 to receive an indication of the load requirement, or may directly measure an amount of power provided to the load 220 to determine the load requirement.

The available secondary power may indicate an amount of power available from the first secondary power source 216. The first secondary power source 216 may include one or more renewable-power sources, such as one or more solar panels. The available secondary power may therefore be available renewable power. The controller 209 may communicate with the first secondary power source 216 to receive an indication of the available secondary power, or may directly measure an amount of secondary power provided by the first secondary power source 216 to determine the available secondary power.

At act 404, the controller 209 determines whether a power rating of the power supplies 210, 212 meets or exceeds a required load power of the load 220. In some examples, the power rating of the power supplies 210, 212 are designed to be substantially similar or identical. As discussed above, one of the power supplies 210, 212 may be configured to draw renewable power from the first secondary power source 216 while the other of the power supplies 210, 212 may be configured to operate in a standby mode, connected to the second secondary power source 218, to prepare to provide backup power as needed. For purposes of example, the first power supply 210 may be used to draw renewable power from the first secondary power source 216 and the second power supply 212 may be used to maintain a connection with the second secondary power source 218. Accordingly, act 404 may include the controller 209 determining whether a power rating of the first power supply 210 (which, in some examples, may be identical to the power rating of the second power supply 210) meets or exceeds the required load power of the load 220. If the required load power is greater than the power rating of the first power supply 210 (404 YES), then the process 400 continues to act 406.

At act 406, the controller 209 controls both of the power supplies 210, 212 to derive output power provided to the load 220 from grid power provided by the primary power source 214. Because the required load power exceeds the power rating of either of the power supplies 210, 212 individually, a single power supply may not be able to provide the required load power within the rated parameters of the power supply. Accordingly, the controller 209 may control the power supplies 210, 212 to provide output power derived from the primary power source 214 in parallel. In various examples, the controller 209 may operate the AC/DC converters 310, 316 to draw AC grid power from the primary power source 214, convert the AC grid power to DC power, and provide the DC power to the DC/AC inverters 314, 320, respectively. The controller 209 may operate the DC/AC inverters 314, 320 to draw the DC power from the AC/DC converters 310, 316, respectively, convert the DC power to AC output power, and provide the AC output power to the load 220.

Figure 5:
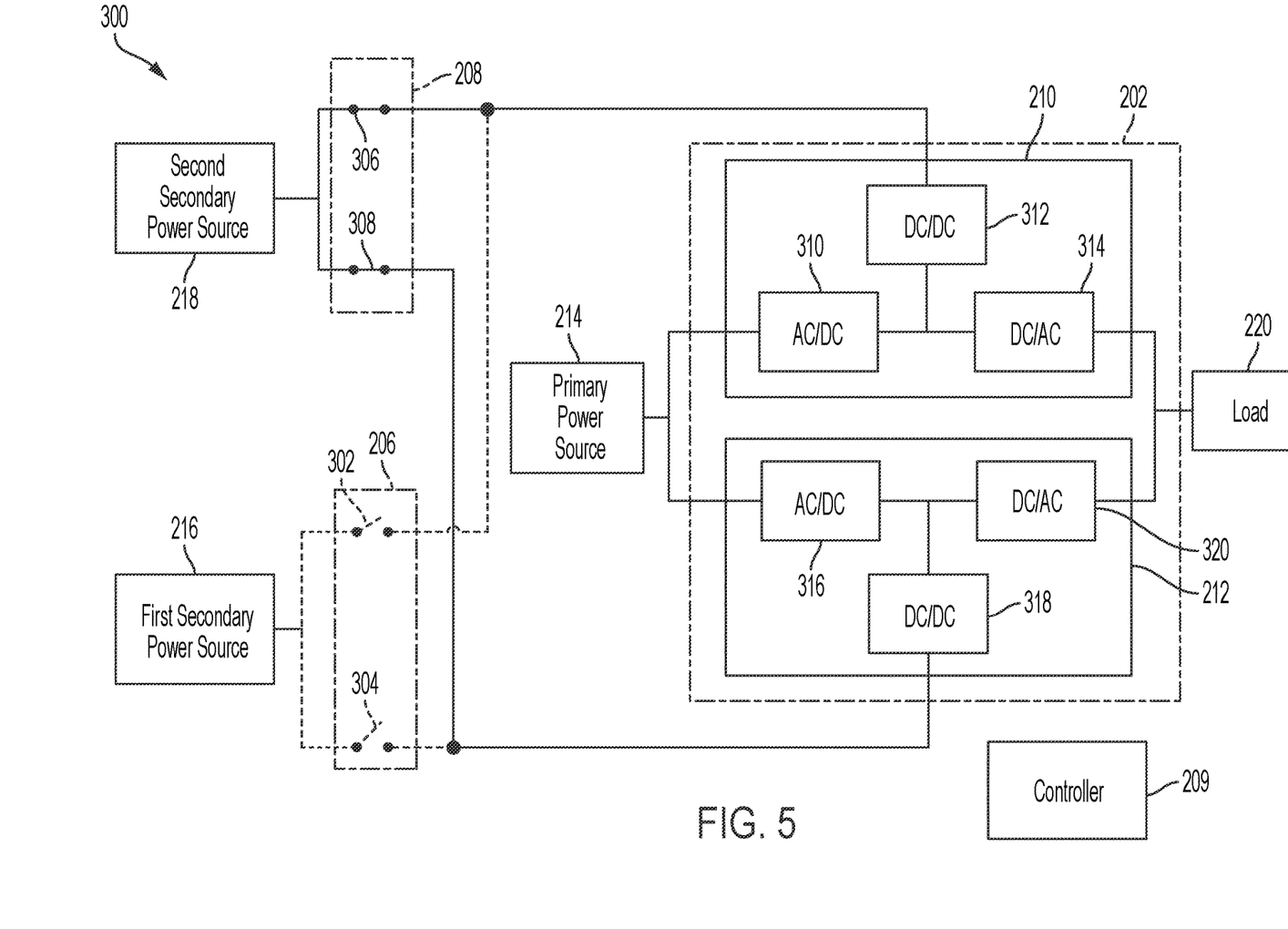
FIG. 5 illustrates a block diagram of a power supply system in a first state according to an example.

At act 408, the controller 209 couples both the power supplies 210, 212 to the second secondary power source 218 to standby for a fault. For example, the controller 209 may control the backup-power switches 306, 308 to be closed and conducting, thereby coupling the first DC/DC converter 312 to the second secondary power source 218 via the first backup-power switch 306 and the second DC/DC converter 318 to the second secondary power source 218 via the second backup-power switch 308. FIG. 5 illustrates a block diagram of the power supply system 300 at act 408 according to an example in which the backup-power switches 306, 308 are controlled by the controller 209 to be closed and conducting, and in which solid lines represent connections along which appreciable current may be passing and dotted lines represent connections along which no appreciable current may be passing.

By maintaining a connection between the second secondary power source 218 and the power supplies 210, 212, the power supplies 210, 212 may be capable of responding quickly to a grid outage on the primary power source 214. For example, if the grid power from the primary power source 214 becomes unavailable (for example, due to a blackout condition), the controller 209 may quickly control the DC/DC converters 312, 318 to draw backup power from the second secondary power source 218 to provide uninterrupted output power to the load 220, which may be achieved quickly because the DC/DC converters 312, 318 are already maintaining a connection to the second secondary power source 218. The process 400 then returns to act 402.

Acts 402-408 may be repeated until the controller 209 determines that the power rating of the first power supply 210 meets or exceeds the required load power (404 NO), at which point the process 400 continues to act 410.

At act 410, the controller 209 determines whether the available secondary power, which may be available renewable power, meets or exceeds the required load power. If the available secondary power does meet or exceed the required load power (410 YES), then the first power supply 210 may be capable of satisfying the load requirements using only secondary power. It may be advantageous to satisfy the load requirements using secondary power rather than grid power from the primary power source 214. For example, where the secondary power is renewable power, it may be advantageous to use the renewable power rather than grid power because the renewable power may be more cost efficient and/or environmentally friendly. If the available secondary power does meet or exceed the required load power (410 YES), then the process 400 continues to act 412.

At act 412, the controller 209 controls the first power supply 210 to provide output power derived from secondary power received from the first secondary power source 216 to the load 220. The secondary power received from the first secondary power source 216 may be, for example, renewable power. Act 412 may include the controller 209 controlling the first DC/DC converter 312 to draw secondary power (for example, renewable DC power) from the first secondary power source 216. Act 412 may further include the controller 209 controlling the first renewable-power switch 302 to be closed and conducting such that the first DC/DC converter 312 is coupled to the first secondary power source 216. In various examples, no primary power is drawn from the primary power source 214 at act 412 at least because the load requirements are satisfied by the secondary power.

At act 414, the controller 209 controls the second power supply 212 to derive recharging power derived from the first power supply 210 and provide the recharging power to the second secondary power source 218. In various examples, act 414 may be optionally executed only if excess power (that is, any additional secondary power above the required load power) is available, and/or if the second secondary power source 218, which may include one or more energy-storage devices such as the energy-storage device 126, are to be recharged. The second secondary power source 218 may be recharged if, for example, a state-of-charge (SOC) of the second secondary power source 218 is below a threshold SOC.

Figure 6:
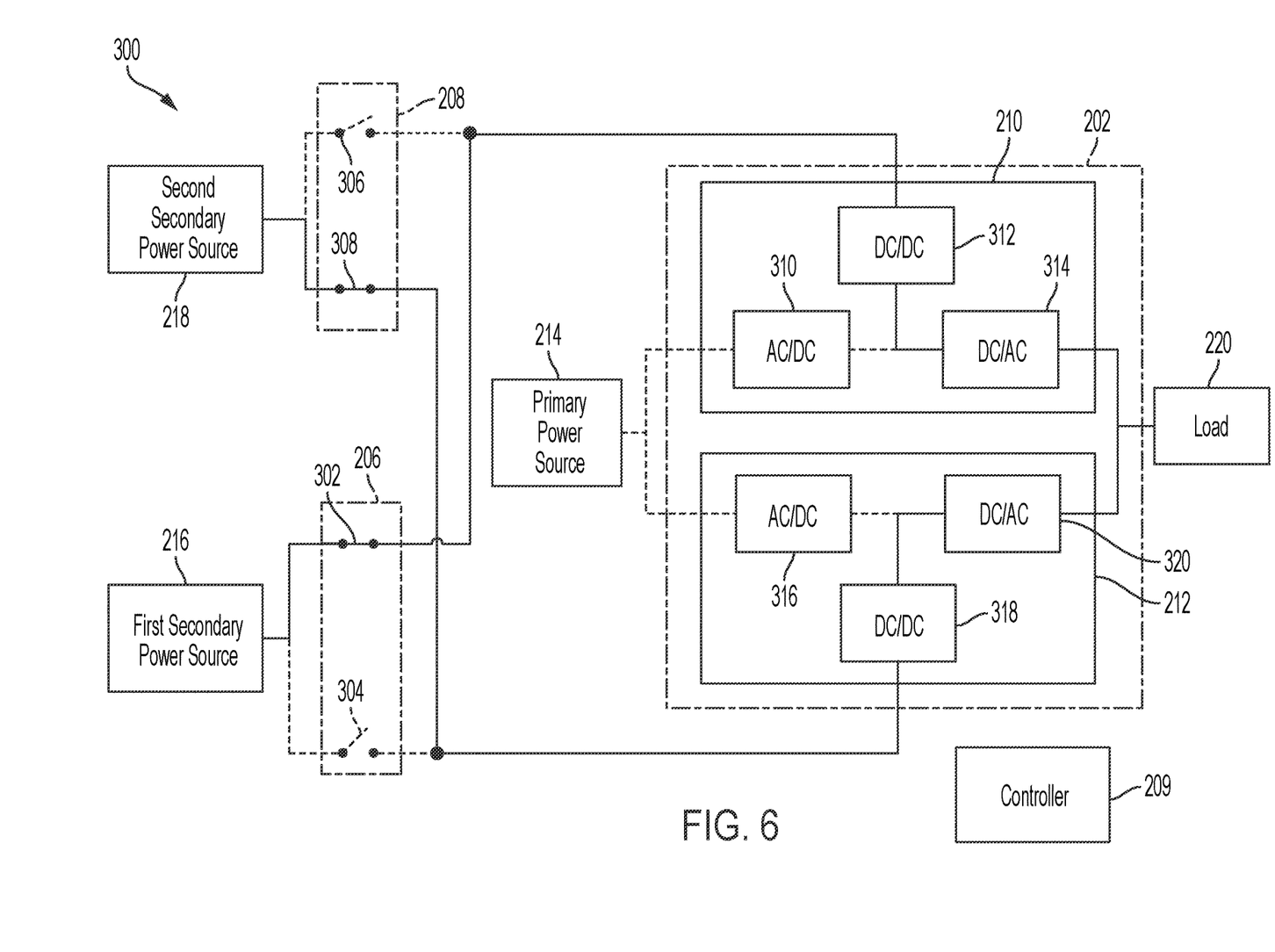
FIG. 6 illustrates a block diagram of a power supply system in a second state according to an example.

Act 414 may include the controller 209 controlling the second DC/AC inverter 320 to draw AC power from the first DC/AC inverter 314, convert the AC power to DC power, and provide the DC power to the second DC/DC converter 318. The controller 209 may further control the second DC/DC converter 318 to convert the received DC power to recharging power and provide the recharging power to the second secondary power source 218 via the second backup-power switch 308. The controller 209 may further control the second backup-power switch 308 to be closed and conducting to couple the second DC/DC converter 318 to the second secondary power source 218. FIG. 6 illustrates a block diagram of the power supply system 300 at acts 412 and 414 in which the first renewable-power switch 302 and the second backup-power switch 308 are controlled to be closed and conducting, and in which solid lines represent connections along which appreciable current may be passing and dotted lines represent connections along which no appreciable current may be passing.

The process 400 may then return to act 402. Acts 402, 404, and 410-414 may be repeated until a determination is made that the available secondary power does not meet or exceed the required load power (410 NO), at which point the process 400 continues to act 416.

At act 416, the controller 209 controls the first power supply 210 to derive output power provided to the load 220 from grid power received from the primary power source 214 and secondary power received from the first secondary power source 216. In some examples, the controller 209 may control the first DC/DC converter 312 to draw substantially all available secondary power from the first secondary power source 216. However, because the required load power exceeds the available secondary power, a difference between the required load power and the available secondary power (that is, a remaining required load power) may be drawn from the primary power source 214 as grid power.

Accordingly, the controller 209 may control the first AC/DC converter 310 to draw grid power from the primary power source 214 in an amount based on a difference between the required load power and the available secondary power (that is, a remaining required load power), which may be available renewable power. The controller 209 further controls the first DC/AC inverter 314 to provide output AC power derived from DC power received from the first AC/DC converter 310 and the first DC/DC converter 312.

Figure 7:
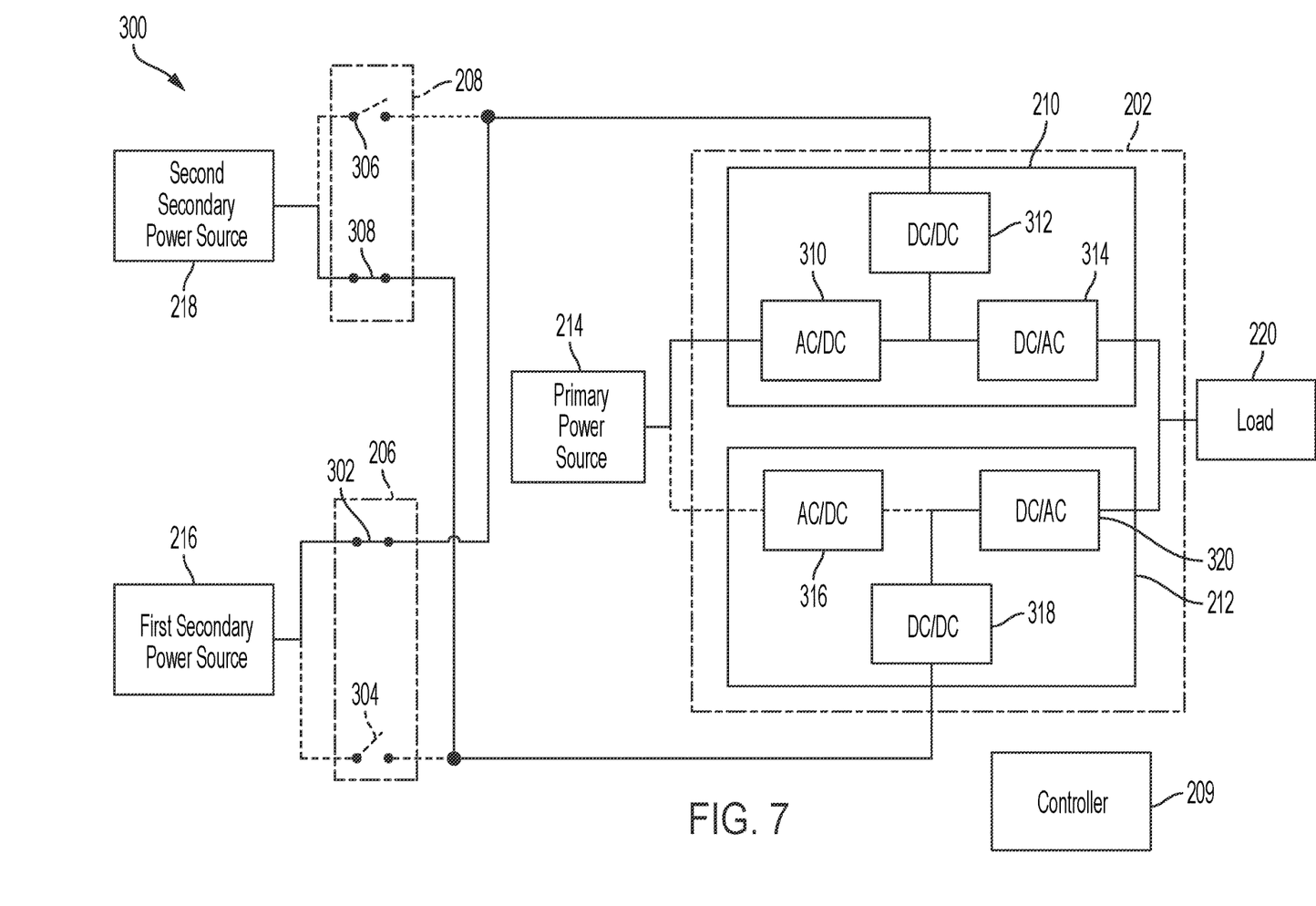
FIG. 7 illustrates a block diagram of a power supply system in a third state according to an example.

At act 418, the controller 209 controls the second power supply 212 and the second secondary power source 218 to operate in a standby mode to prepare to provide power to the load 220. Controlling the second power supply 212 and the second secondary power source 218 to operate in the standby mode may include controlling the second backup-power switch 308 to be closed and conducting such that the second DC/DC converter 318 maintains a connection to the second secondary power source 218. At least because the second DC/DC converter 318 maintains a connection to the second secondary power source 218, the second DC/DC converter 318 may be able to quickly draw backup power from the second secondary power source 218 if, for example, grid power becomes unavailable from the primary power source 214. FIG. 7 illustrates a block diagram of the power supply system 300 at acts 416 and 418 in which the first renewable-power switch 302 and the second backup-power switch 308 are controlled to be closed and conducting, and in which solid lines represent connections along which appreciable current may be passing and dotted lines represent connections along which no appreciable current may be passing.

In the event that grid power becomes unavailable from the primary power source 214, the controller 209 may operate the second DC/DC converter 318 to draw DC backup power from the second secondary power source 218 via the second backup-power switch 308, convert the DC backup power to converted DC power, and provide the converted DC power to the second DC/AC inverter 320. The controller 209 may further control the second DC/AC inverter 320 to convert the converted DC power to AC output power, and provide the AC output power to the load 220.

The process 400 then returns to act 402, and the process 400 may be executed from act 402 as discussed above. The process 400 may be executed repeatedly during operation of the power supply system 200 and the controller 209.

As discussed above, example power supplies (for example, the power supplies 210, 212) may be implemented as uninterruptible power supplies or, for example, power modules within a single uninterruptible power supply. In some examples, each of the power supplies 210, 212 may have the same or a similar power rating. In other examples, the power supplies 210, 212 may have different power ratings. In various examples, the power supplies 210, 212 may have respective power ratings that are sufficient to meet expected load requirements of a connected load, although the power ratings may be the same or different.

Various controllers, such as the controller 209, may execute various operations discussed above. Using data stored in associated memory and/or storage, the controller 209 also executes one or more instructions stored on one or more non-transitory computer-readable media, which the controller 209 may include and/or be coupled to, that may result in manipulated data. In some examples, the controller 209 may include one or more processors or other types of controllers. In one example, the controller 209 is or includes at least one processor. In another example, the controller 209 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A power supply system comprising:
   at least one first input configured to be coupled to a primary power source;
   at least one second input configured to be coupled to a first secondary power source and configured to be coupled to a second secondary power source;
   an output configured to be coupled to a load;
   a first power supply coupled to the at least one first input and to the at least one second input;
   a second power supply coupled to the at least one first input and to the at least one second input; and
   at least one controller coupled to the first power supply and the second power supply, the at least one controller being configured to:
   receive a load-power measurement associated with a required load power;
   determine whether the required load power is greater than an available secondary power, the available secondary power being available from the first secondary power source; and
   control, responsive to determining that the required load power is greater than the available secondary power,
   the first power supply to provide output power to the output, the output power being derived from the primary power source and the first secondary power source, and
   the second power supply and the second secondary power source to operate in a standby mode to prepare to provide power to the output.

2. The power supply system of claim 1, wherein the at least one second input includes a first connection and a second connection.

3. The power supply system of claim 2, wherein the first connection and the second connection are each switchably couplable to the first secondary power source or the second secondary power source.

4. The power supply system of claim 2, wherein the first power supply is switchably couplable to the first secondary power source or the second secondary power source via the first connection, and wherein the second power supply is switchably couplable to the first secondary power source or the second secondary power source via the second connection.

5. The power supply system of claim 4, wherein controlling the first power supply to provide the output power to the output includes switchably coupling the first power supply to the first secondary power source via the first connection, and wherein controlling the second power supply and the second secondary power source in the standby mode includes switchably coupling the second power supply to the second secondary power source via the second connection.

6. The power supply system of claim 1, wherein the first secondary power source is a renewable power source and the secondary power is renewable power, and wherein controlling the first power supply to provide the output power to the output includes controlling the first power supply to draw the available renewable power from the renewable power source and controlling the first power supply to draw a remaining required power from the primary power source, the remaining required power being determined based on a difference between the required load power and the available renewable power.

7. The power supply system of claim 1, wherein the first power supply includes a first AC/DC converter, a first DC/DC converter, and a first DC/AC converter, and the second power supply includes a second AC/DC converter, a second DC/DC converter, and a second DC/AC converter.

8. The power supply system of claim 7, wherein the first AC/DC converter and the second AC/DC converter are coupled to the at least one first input.

9. The power supply system of claim 7, wherein the first DC/DC converter and the second DC/DC converter are coupled to the at least one second input.

10. The power supply system of claim 9, wherein the at least one second input includes a first connection coupled to the first DC/DC converter and a second connection coupled to the second DC/DC converter.

11. The power supply system of claim 7, wherein the first DC/AC converter and the second DC/AC converter are coupled to the output.

12. The power supply system of claim 1, wherein the first power supply is a first uninterruptible power supply and the second power supply is a second uninterruptible power supply.

13. The power supply system of claim 1, further comprising an uninterruptible power supply including the first power supply and the second power supply.

14. The power supply system of claim 1, wherein the at least one controller is configured to control the first power supply to provide the output power to the output and control the second power supply and the second secondary power source to operate in the standby mode responsive to determining that:
the required load power is greater than the available secondary power, and
the required load power is not greater than a power rating of the first power supply.

15. The power supply system of claim 1, wherein the at least one controller is further configured to control, responsive to determining that the required load power is not greater than the available secondary power:
the first power supply to provide second output power to the output, the second output power being derived from the first secondary power source, and
the second power supply and the second secondary power source to operate in the standby mode.

16. The power supply system of claim 15, wherein the at least one controller is further configured to control the second power supply to provide recharging power derived from the available secondary power to the second secondary power source responsive to determining that the required load power is not greater than the available secondary power.

17. The power supply system of claim 1, wherein the at least one controller is configured to control, responsive to determining that the required load power is greater than the available secondary power and that the required load power is greater than a power rating of the first power supply, the first power supply and the second power supply to:
provide second output power to the output, the second output power being derived from the primary power source, and
maintain at least one connection between the output and the second secondary power source.

18. The power supply system of claim 1, wherein the first secondary power source is a renewable power source.

19. The power supply system of claim 1, wherein the second secondary power source is an energy-storage device.

20. A non-transitory computer-readable medium storing thereon sequences of computer-executable instructions for controlling a power supply system including at least one first input configured to be coupled to a primary power source, at least one second input configured to be coupled to a first secondary power source and configured to be coupled to a second secondary power source, an output configured to be coupled to a load, a first power supply coupled to the at least one first input and the at least one second input, and a second power supply coupled to the at least one first input and to the at least one second input, the sequences of computer-executable instructions including instructions that instruct at least one processor to:
receive a load-power measurement associated with a required load power;
determine whether the required load power is greater than an available secondary power, the available secondary power being available from the first secondary power source; and
control, responsive to determining that the required load power is greater than the available secondary power:
the first power supply to provide output power to the output, the output power being derived from the primary power source and the first secondary power source, and
the second power supply and the second secondary power source to operate in a standby mode to prepare to provide power to the output.

21. The non-transitory computer-readable medium of claim 20, wherein the first secondary power source is a renewable power source and the secondary power is renewable power, and wherein controlling the first power supply to provide the output power to the load includes controlling the first power supply to draw the available renewable power from the renewable power source and controlling the first power supply to draw a remaining required power from the primary power source, the remaining required power being determined based on a difference between the required load power and the available renewable power.

22. The non-transitory computer-readable medium of claim 20, wherein the instructions instruct the at least one processor to control the first power supply to provide the output power to the load and operate the second power supply and the second secondary power source responsive to:
the required load power being greater than the available secondary power, and
the required load power being less than or equal to a power rating of the first power supply.

23. The non-transitory computer-readable medium of claim 20, wherein the instructions instruct the at least one processor to control, responsive to determining that the required load power is not greater than the available secondary power:
  the first power supply to provide second output power to the load, the second output power being derived from the first secondary power source, and
  the second power supply and the second secondary power source to operate in the standby mode.

24. The non-transitory computer-readable medium of claim 23, wherein the instructions instruct the at least one processor to control the second power supply to provide recharging power derived from the available secondary power responsive to determining that the required load power is not greater than the available secondary power.

25. The non-transitory computer-readable medium of claim 20, wherein the instructions instruct the at least one processor to control, responsive to determining that the required load power is greater than the available secondary power and that the required load power is greater than a power rating of the first power supply, the first power supply and the second power supply to:
  provide second output power to the load, the second output power being derived from the primary power source, and
  maintain at least one connection between the power supply system and the second secondary power source.

26. A method for controlling a power supply system including at least one first input configured to be coupled to a primary power source, at least one second input configured to be coupled to a first secondary power source and configured to be coupled to a second secondary power source, an output configured to be coupled to a load, a first power supply coupled to the at least one first input and the at least one second input, and a second power supply coupled to the at least one first input and to the at least one second input, the method comprising:
  receiving a load-power measurement associated with a required load power;
  determining whether the required load power is greater than an available secondary power, the available secondary power being available from the first secondary power source; and
  controlling, responsive to determining that the required load power is greater than the available secondary power:
    the first power supply to provide output power to the output load, the output power being derived from the primary power source and the first secondary power source, and
    the second power supply to operate in a standby mode and maintain a connection between the power supply system and the first secondary power source.

27. The method of claim 26, wherein controlling the first power supply to provide the output power to the load includes controlling the first power supply to draw the available secondary power from the first secondary power source and controlling the first power supply to draw a remaining required power from the primary power source, the remaining required power being determined based on a difference between the required load power and the available secondary power.

28. The method of claim 26, further comprising controlling the first power supply to provide the output power to the load and operate the second power supply and the second secondary power source in the standby mode responsive to:
  the required load power being greater than the available secondary power, and
  the required load power being less than or equal to a power rating of the first power supply.

29. The method of claim 26, further comprising controlling, responsive to determining that the required load power is not greater than the available secondary power:
  the first power supply to provide second output power to the load, the second output power being derived from the first secondary power source, and
  the second power supply and the second secondary power source to operate in the standby mode.

30. The method of claim 29, further comprising controlling the second power supply to provide recharging power derived from the available secondary power responsive to determining that the required load power is not greater than the available secondary power.

31. The method of claim 26, further comprising controlling, responsive to determining that the required load power is greater than the available secondary power and that the required load power is greater than a power rating of the first power supply, the first power supply and the second power supply to:
  provide second output power to the load, the second output power being derived from the primary power source, and
  maintain at least one connection between the power supply system and the second secondary power source.

* * * * *